Jan. 31, 1967    J. H. ANDRESEN, JR    3,302,167
AIRSPEED WARNING DEVICE
Filed June 22, 1965    3 Sheets-Sheet 2

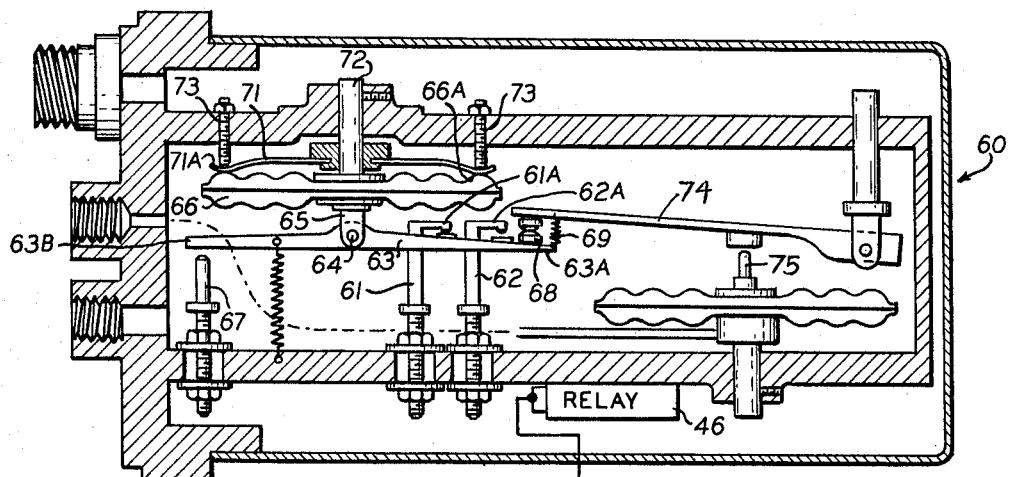
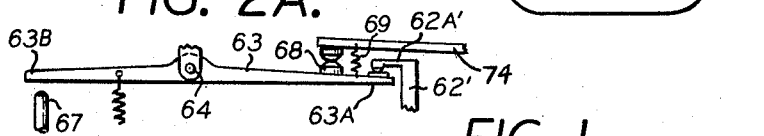
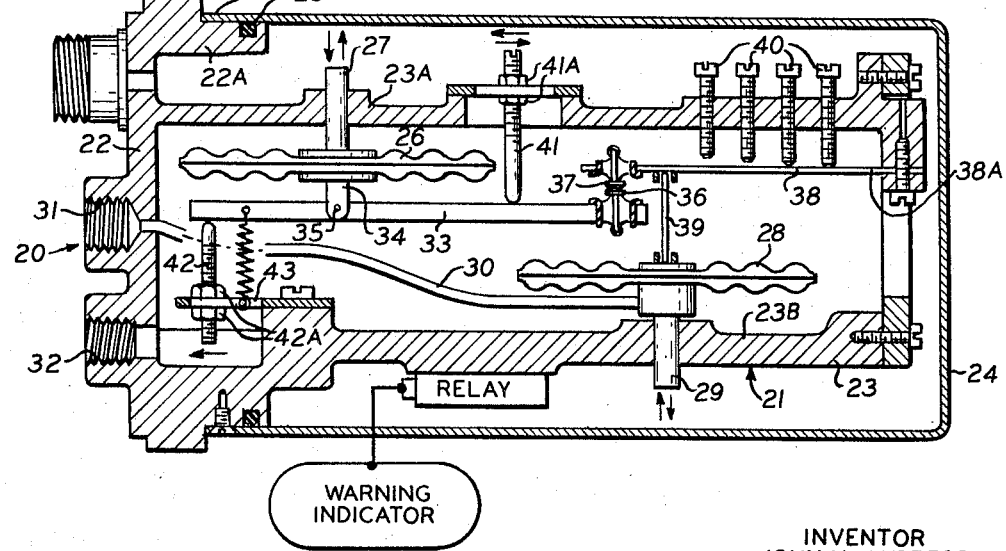

INVENTOR
JOHN H. ANDRESEN, JR.
BY
Hubbell, Cohen & Stiefel
ATTORNEYS.

Jan. 31, 1967  J. H. ANDRESEN, JR  3,302,167
AIRSPEED WARNING DEVICE
Filed June 22, 1965  3 Sheets-Sheet 3
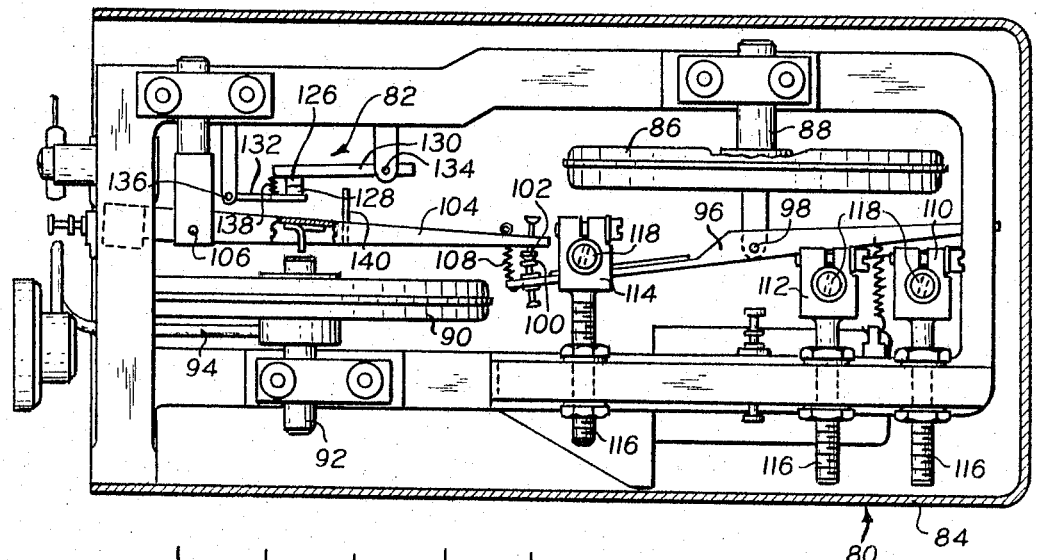
INVENTOR
JOHN H. ANDRESEN, JR.
BY
Hubbell, Cohen, Stiefel & Siddler
ATTORNEYS.

United States Patent Office 3,302,167
Patented Jan. 31, 1967

3,302,167
AIRSPEED WARNING DEVICE
John H. Andresen, Jr., Hewitt, N.J., assignor to Astek Instrument Corp., Armonk, N.Y., a corporation of New York
Filed June 22, 1965, Ser. No. 469,051
9 Claims. (Cl. 340—27)

This application is a continuation-in-part application of application Serial No. 240,607 filed November 28, 1962.

This invention relates to an airspeed warning device, and more specifically to an airspeed warning device for use in aircrafts having maximum allowable airspeed characteristics that varies with altitude.

In high speed subsonic and supersonic aircrafts it is essential for the safety of both pilot and aircraft that the safe maximum airspeed assigned to a given such aircraft not be exceeded. For this reason it is desirable to provide some means for appraising a pilot when the maximum allowable airspeed is exceeded so that appropriate action may be taken to reduce the airspeed of the aircraft to a safe operating value for that craft.

Therefore an object of this invention is to provide an airspeed warning device which is automatically operated by Pitot and static pressure when the aircraft exceeds the maximum permissive airspeed for a given altitude.

Another object is to provide a novel airspeed and mach warning indicator for use in high speed aircraft for positively appraising a pilot when when the maximum safe allowable airspeed and mach number is exceeded where each is a limiting parameter.

Still another object is to provide an airspeed warning indicator for positively appraising a pilot of the maximum allowable airspeed for an aircraft having maximum airspeed characteristics that increase as altitude increases up to a predetermined altitude at which a mach limitation is reached.

Still another object is to provide an airspeed warning device for appraising a pilot when the airspeed of an aircraft exceeds its maximum allowable airspeed by energizing either a visible and/or audible alarm.

Still another object is to provide a novel airspeed and Mach warning indicator for use in high speed aircraft for positively appraising a pilot when the maximum safe allowable airspeed and mach number is exceeded whereby the same is selectively operated to vary the warning indication in accordance with specific flight characteristics of the aircraft.

Still another object is to provide a novel airspeed and mach warning indicator wherein the portion of the maximum allowable speed controlled by altitude up to a predetermined altitude may be selected between any of one or more flight characteristics of an aircraft.

Still another object is to provide a novel airspeed and mach warning indicator which can be selectively operated to indicate either the maximum allowable airspeed controlled that varies with altitude or the maximum allowable airspeed that is constant for a given range of altitude depending on the flight characteristic of an aircraft.

In accordance with this invention the airspeed indicating device comprises essentially a switch construction including a pair of movable contacts connected in a circuit to relay means which when operated from its normal to operated condition energizes an indicating alarm means, the alarm means being energized only when the speed of the aircraft exceeds a safe value. In accordance with this invention the movable contacts are operated upon by the pitot and static pressures to which the device is subjected. The arrangement is such that one contact is carried by a floating lever which is fulcrumed and rendered responsive to the expansion and contraction of an altitude capsule means. The other contact is carried on a second lever in a manner which permits the contact connected thereto to follow the movement of the first mentioned contact and contains a spring connected to the first mentioned contact which biases the contacts closed during such movement. The movable contacts are thus maintained closed during the permissive airspeeds of the aircraft at given altitudes.

Operatively associated with the second lever is an airspeed capsule which functions to displace the second lever and thereby open the contacts causing a relay to deactivate and energize a warning indicator when the safe airspeed is exceeded. Operatively associated with the floating lever are two or more adjustable stops which limit the motion of the floating lever. The stop means are disposed on either side of the floating lever fulcrum to control the movement of the contacts for determining a change in the limiting airspeed of the aircraft, one of the stop or pivot means determining the limiting speed at the lower altitudes, and the other for determining the limiting speeds at a higher altitude. In a modified embodiment a plurality of stop means are provided on the same or opposite sides of the fulcrum for determining changes in the limiting airspeed at the lower altitudes. Means are also provided for calibrating the airspeed capsule expansion. Also a mechanical stop means may be operatively associated with the altitude capsule for determining a limiting position thereof so that the contacts close at the same airspeed regardless of altitudes up to the altitude at which the capsule starts to move.

In another form of the invention the airspeed indicating device is provided with a built-in means wherein the warning indicator may be selectively operated at the option of the pilot, depending on the flight characteristic of a particular flight to vary the warning indications accordingly. This form of indicating device includes a means which is rendered selectively operated to positively appraise a pilot of the maximum allowable airspeed for an aircraft having a maximum airspeed characteristic that increases as altitude increases up to a predetermined altitude at which a mach limitation is reached, or of appraising a pilot of maximum allowable airspeed of an aircraft having an airspeed characteristic that is maintained constant in a predetermined altitude range before the mach limitation is reached.

A feature of this invention resides in the provision that the proportions of the levers and the expansion rates of the capsules may be varied for calibrating of the device for use in many types of aircraft.

Another feature resides in the provision wherein the airspeed warning device is relatively simple in construction and positive in operation.

Another feature of this invention resides in the provision of an airspeed warning device in which the indicating signal may be selectively activated to give an alarm in accordance with one of a plurality of different flight characteristics.

Other features and advantages will become more readily apparent when considered in view of the drawings in which:

FIG. 1 is a sectional side view of the airspeed warning device of this invention;

FIG. 2 is a sectional side view of a slightly modified form of the invention;

FIG. 2A is a fragmentary sectional side view of another form of the invention;

FIG. 8 is a sectional side view of still another modified form of the invention;

FIG. 9 is a graphic representation of the plurality of readily selectable airspeed curves possible with the form of the invention depicted in FIG. 8; and FIG. 10 is a schematic wiring diagram of the circuit as applied to the form of the invention illustrated in FIG. 9.

Figure 4:
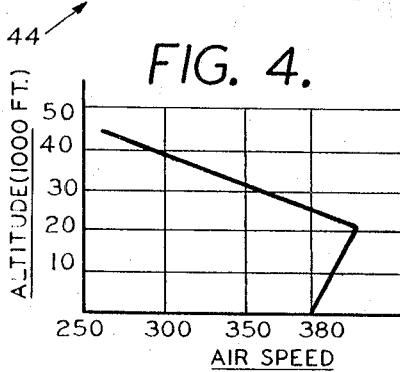
FIG. 4 is a graphic representation of a typical limiting speed curve for an aircraft having a maximum speed characteristic that varies with altitude.

With reference to the drawings, FIG. 4 illustrates a typical speed curve for certain types of high speed aircraft having a maximum allowable speed that is at times dependent on airspeed and at other times dependent upon a Mach speed. Since the speed of sound is a variable, the mach number for a given indicated airspeed will increases as altitude increases. Frequently such aircraft have a maximum allowable airspeed for various levels of flight in the lower altitude ranges which will also vary as indicated by the lower portion of the speed curve. In such aircraft the maximum allowable airspeed will usually increase with altitude as indicated. Therefore, it is essential for the safety of both pilot and aircraft to provide in such aircraft, an airspeed warning device which will automatically and positively appraise a pilot when the maximum allowable airspeed in either speed range is exceeded for a given altitude.

Referring to the drawings, FIG. 1 illustrates a typical airspeed warning device 20 of this invention. It comprises a cast framework 21 having a front end 22 and a connected body portion 23. The body portion 23 of the framework 21 is enclosed in a cup shaped housing 24 which is connected at its open end 24A to a peripheral flange 22A formed integrally with the front end 22 of the cast framework 21. If desired the connection between the housing 24 and the framework 21 may be sealed by an O ring 25.

Disposed within the body 23 of the framework 21 is an aneroid altitude capsule 26 which is adapted to expand and contract in response to changes in altitude. In the illustrated embodiment the altitude capsule 26 is connected to the upper wall 23A of the framework body 23 by an adjustable center post 27.

To the rear of the framework 21 there is disposed an airspeed capsule 28 which is arranged to expand and contract in response to changes in airspeed. Accordingly, the airspeed capsule 28 is connected to the lower wall 23B of the body portion 23 by an adjustable post 29. A conduit 30 connecting with the Pitot coupling 31 of the device forms the connection between airspeed capsule 28 and the Pitot tube (not shown) of the aircraft, the interior of the device 20 being open to the static pressure through the static tap (not shown) which connects to the static coupling 32 of the device.

In accordance with this invention a floating lever 33 is connected intermediate the ends thereof to the center piece 34 of the altitude capsule 26 about a pivot 35. Connected to the inner or right end of the lever 33, as viewed in FIG. 1, is an electrical contact 36, which is one of a pair of movable contacts. The other contact 37, arranged to engage contact 36, is carried on the end of an airspeed restraining spring 38. As shown spring 38 is cantileverly supported at one end 38A to the rear end of the body portion 23. The spring 38 is arranged to extend over the center piece 39 of the airspeed capsule 28 whereby the latter is adapted to operate upon the expansion and contraction thereof on the spring 38. The arrangement of the contacts 36 and 37 is such that the spring 38 will normally urge contact 37 into engagement with contact 36. Also the spring 38 will permit contact 37 connected thereto to follow the movement of contact 36 so long as the maximum allowable speed of the aircraft is not exceeded as will be hereinafter described. It will be observed that in the form illustrated in FIG. 1, the center piece 39 of the airspeed capsule 28 is arranged to push the restraining spring 38 upwardly as airspeed is increased. To provide a fine calibration of the airspeed capsule expansio in the high speed ranges, several adjustable calibrating screws 40 are provided. These screws 40 are useful in shaping the maximum allowable curve below a given altitude, e.g., 22,500 ft., where the equivalent airspeed relationship holds and where the tolerances are the most difficult to achieve.

In accordance with this invention there is disposed on either side of the floating lever pivot 35 a stop or limiting pivot means. In the form of FIG. 1, two such limiting pivot means are shown. Each of the stops or pivot means comprises an adjustable screw 41 and 42; each are maintained in their respective adjusted positions by lock nuts 41A and 42A respectively. As shown, stop screw 41 depends from the top 23A of the framework 21 to engage the floating lever 33 at a point intermediate pivot 35 and the right end of the lever 33. The other stop screw 42 projects upwardly from a mounting 43 connected to the bottom wall 23B of the framework 21 in the vicinity of the left end of lever 33.

The movable contacts 36, 37 are electrically connected in a circuit 44 containing an indicating or warning means 45 which may be either an audible alarm, e.g., a bell or horn, and/or a visible alarm, e.g., a light. The warning indicator 45 is suitably located within the cockpit of the aircraft. Included in the circuit 44 is a relay 46 for energizing the alarm or indicator 45 when the movable contacts 36, 37 are opened by the center piece 39 of the airspeed capsule as the safe allowable airspeed of an aircraft for a given altitude is exceeded.

Figure 3:
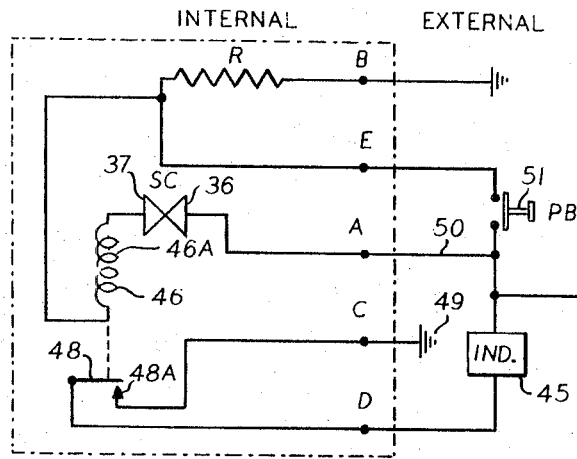
FIG. 3 is a schematic wiring diagram of the circuit of the instant invention.

Referring to the circuit diagram of FIG. 3, the warning indicating means 45 is connected in series with a source of electrical energy 47, e.g., a battery and a normally opened back contact switch 48 of a relay 46, one of the back contacts 48A being connected to ground 49, the arrangement being such that the indicator 45 is de-energized so long as back contacts 48, 48A are opened. The relay coil 46A for activating the back contacts 48, 48A is connected in series with the normally closed movable contacts 36, 37, the coil normally energized through conductor 50 which connects with the power supply 47 when the contacts 36, 37 are closed. When contacts 36, 37 are opened by the center piece 39 of the airspeed capsule 28, when safe airspeed is exceeded as hereinbefore described, the relay 46 becomes de-energized, thus activating the back contacts 48, 48A to closed position and thereby completing the circuit to the indicating means 45. When this occurs the indicating means become energized and the alarm is sounded that the airspeed is exceeded. The alarm remains energized until the airspeed is reduced to a safe operating value.

In order to test the operation of the warning device while the aircraft is grounded for pre-flight purposes, a testing circuit is included. This portion of the circuitry includes a normally open push button switch 51 connected between terminals E and A to short out the relay coil 46A when the push button is pushed closed. Thus when the aircraft is standing on the ground, the pilot need only to close the push button 51 to check the warning device 45 out.

The operation of the airspeed warning device is as follows.

At low altitudes, when the altitude capsule 26 is collapsed, the floating lever 33 connected thereto will engage pivot stop 41 and it will tend to pivot about stop 41 as a center as the capsule 26 expands. As the altitude of the aircraft increases, e.g., say 1,000 to 22,500 ft., the electrical contact 36 carried by the floating lever 33 will move upwardly forcing the other contact 37 connected to spring 38 to move with it. At say, 22,500 ft., the left end of the floating lever engages stop 42, and stop 42 now acts as pivot point for the floating lever. When this occurs the electrical contacts 36 begins to move downward. Because of the restraining spring 38, the other contact 37 will follow contact 36 during normal airspeeds.

The airspeed capsule 28 is provided with a center piece 39 arranged to push the restraining spring 38 upwardly as airspeed is increased. Thus, when the safe airspeed limit is exceeded, the center piece 39 pushes on the restraining spring 38 an amount sufficient to cause the movable contacts 36, 37 to open, and thereby effecting de-energization of the relay 46, which results in the actuation of the warning indicator.

The separate adjustments of the pivot stops 41, 42 and their relative position along the lever permits for accurate slope adjustments to any required speed curve for a given aircraft. These adjustments also permit for recalibration over a considerable slope range in the event that new calibration requirements should arise due to changes in the given aircraft.

A slightly modified warning device 60 is shown in FIG. 2. The form of FIG. 2 is similar in all respects, as herein described with reference to the device of FIG. 1, except that a plurality of pivot stops 61, 62 are spaced along the floating lever 63 between its fulcrum 64 to the center piece 65 of the altitude capsule 66 and the right end 63A of the lever 63. In this arrangement stops 61, 62 are shown as adjustable screws having upper hook shaped ends 61A, 62A which are adapted to engage the upper surface of floating lever 63. Another end stop 67 is arranged to act on the left end 63B of lever 63. The lever 74, which is responsive to movement in the airspeed capsule, is rigid rather than a spring member.

In operation the warning device 60 of FIG. 2 is similar as described except that the stops 61, 62 are adjusted so the lever arm of the floating lever varies in the lower altitude ranges thereby varying the limiting airspeeds at the lower altitudes. For example as the altitude capsule 66 expands, in the modified form of FIG. 2 the lever arm 63 will first engage stop 61 nearest fulcrum 64 so as to indicate one limiting airspeed. As altitude increases, the floating lever 63 rocks unto the next stop 62 where it will cause less motion of the contact 68, connected thereto, as altitude changes. Finally, the other end 63B of the lever 63 will engage end stop 67 to move contact 68 faster in the opposite or downward direction. This latter movement constitutes the constant mach part of the altitude versus airspeed curve.

In the airspeed warning devices described, it will be noted that it is possible to utitlize either a linear expansion or exponential expansion capsule to provide suitable operation. In order to achieve the specified accuracy at 30,000 to 50,000 ft., particularly through the temperature range of 0° C. to 50° C., it is advantageous to use non-linear capsules. The use of non-linear capsules results in approximately equal contact motions per knot at all airspeeds, and more important, equal contact motion per foot at all altitudes. With this motion, the effect in feet of altitude error of thermal expansion on the mechanism part does not become excessive at the higher altitudes where the pressure change per foot is only twenty percent of that at sea level.

If desired a mechanical stop may be provided for the altitude capsule to cause the movable contacts of the devices illustrated to close at the same airspeed regardless of altitude up to the altitude at which the altitude capsule starts to move. This means that the mechanical altitude capsule, to be now described, functions as a single airspeed switch at the lower altitudes.

Figure 6:
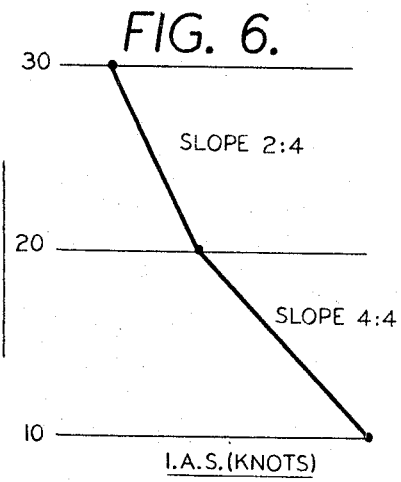
FIG. 6 is a graphic representation of the slope of the airspeed curve utilizing an altitude stop setting of the type disclosed in FIG. 2.

For purposes of description, the mechanical altitude stop 70 is illustrated in the embodiment of FIG. 2. However, it will be readily understood that the same stop 70 may be incorporated in the embodiment of FIG. 1. The mechanical stop preferably comprises a restraining spring element 71 which is secured to the adjusting post 72 of the altitude capsule 66. The arrangement is such that the outer extremities 71A of the element 71 are arranged to engage the outermost corrugation of the upper diaphragm 66A of the capsule 66. A pair of adjusting screws 73 are provided to adjust the position of the restraining element. Thus it will be apparent that the altitude at which the full altitude capsule 66 will begin to expand can be controlled. The operation of the mechanical capsule stop is as follows: If the free deflection of the capsule 66 causes the fulcrum pivot 64 to move .070 inch for a pressure change from sea level (30" Hg abs.) to 10" Hg absolute, then with restraining element 71 set to touch the diaphragm 66A of capsule 66 at 10,000 feet of altitude (20" Hg abs.), the fulcrum point 64 will move .035" for a pressure change from 10" Hg abs. to 20" Hg abs., and it will travel one half that distance or .0175" for a pressure change from 20" Hg abs. to 30" Hg abs. This applies when the slope of the airspeed limit curve ranges in the ratio of 2 to 1 as graphically illustrated in FIG. 6. It will be understood, however, that device 60 could be employed without the stop including spring 71 and screws 73 in which event the device would give a warning in accordance with the curve of FIG. 4.

Figure 5:
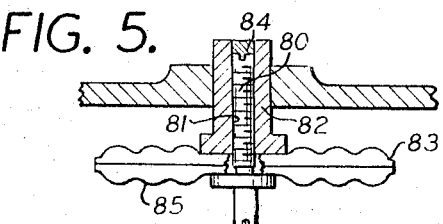
FIG. 5 is a fragmentary detail of a modified stop setting for the altitude capsule.
Figure 7:
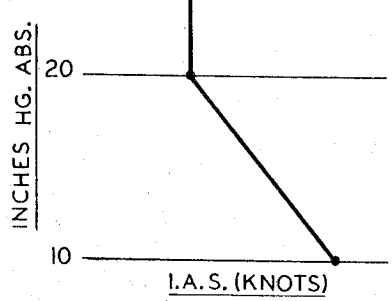
FIG. 7 is a graphic representation of the slope of an airspeed curve utilizing an altitude stop setting of the type disclosed in FIG. 5.

FIG. 5 illustrates a modified altitude stop means. It will be understood that the stop means of FIG. 5 may be utilized in either form of the invention. In this form of the invention the stop means comprises an adjusting screw 80 which is threaded in a bore 81 extending through the adjusting post 82 of the altitude capsule 83. A soft solder 84 may be employed for sealing the bore 81 above the screw 80. In this arrangement the end of the screw 80 is arranged to engage the lower diaphragm element 85 of the capsule. The operation of this form of stop is as follows: If the airspeed limit curve has a characteristic as shown in FIG. 7, then the stop 80 inside capsule 83 can be set to stop the free deflection of the aneroid entirely at a pre-determined altitude or absolute pressure. In the sample curve shown in FIG. 7, this would occur at 20" Hg abs.

For alternate arrangements, if the two diaphragms which make up the altitude capsule are made of different thicknesses, and the stop is operated to limit the movement of one-half of the capsule or one diaphragm, then ratios other than 2:1 can be obtained between the free travel and restrained travel of the respective diaphragm elements, depending upon the ratio of thickness of the two diaphragm elements. In this manner slope changes of from 4:4 to 4:3; 4:4 to 3:4; 4:4 to 3:1 or 4:4 to 1:3, and many other combinations may be obtained.

Figure 4A:
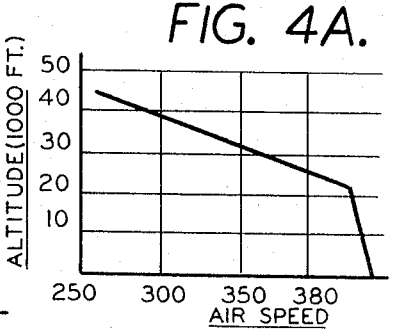
FIG. 4A is a graphic representation of another form of limiting speed curve for an aircraft having a maximum speed characteristic that varies with altitude.

Referring now to FIG. 4A, there is shown therein a maximum air speed characteristic curve for an aircraft whose maximum airspeed is controlled by altitude up to a certain altitude and above said altitude is dependent upon mach number. In this regard, it is altogether similar to FIG. 4 but varies therefrom in that in the lower altitude range wherein airspeed is the controlling factor, the maximum airspeed allowable decreases slightly as altitude increases. In such an aircraft the preferred manner of modifying the device 60 illustrated in FIG. 2 in order to give a warning in accordance with the characteristic curve illustrated in FIG. 4A is shown in FIG. 2A. In FIG. 2A a stop or fulcrum 62' is provided to engage the floating lever 63 to the right of the contacts 68 rather than to the left of said contacts. With such an arrangement at lower altitudes the floating lever 63 will be in engagement with the fulcrum 62' as at 63A and will pivot about said fulcrum so that as altitude increases the floating lever 63 will move downwardly and thereby permit the lever 74 which is driven by the airspeed capsule to move downwardly toward the plunger 75 of the airspeed capsule. Accordingly, as altitude increases in the lower altitude range the rigid lever 74 will be permitted to move ever more closely to the airspeed capsule plunger or center piece 75 whereby as airspeed increases in said lower ranges the lever 74 will be engaged sooner by the airspeed capsule center piece and moved upwardly to disengage or open the contacts 68. As altitude continues to increase in the lower altitude range the speed at which the contacts will open will constantly decrease. However, the rate of decrease is slight due to the fact that the contacts 68 are so close to the fulcrum 62A' and, therefore, the movement of the contacts is relatively slight. However, at the altitude at which mach number becomes the critical consideration, the floating lever 63 will have been moved downwardly sufficiently to engage the stop 67 as at 63B, and further increases in altitude will cause a pivoting about the fulcrum 67 which will tend to separate the contacts 68 more quickly in response to a given increase in altitude, this being due to the greatly elongated lever arm. This qualitative description is in fact a description of the curve shown in FIG. 4A and thereby establishes the fact that the modification shown in FIG. 2A will yield a characteristic curve as shown in FIG. 4A. The remainder of the apparatus functions precisely as that shown in FIG. 2 and in the circuit diagram of FIG. 3. It will also be realized that various other modifications may be employed in combination with FIG. 2A such as shown in FIG. 7, for example.

Referring to FIGS. 8 and 10, there is illustrated still another modified form of the invention. In this form of the invention the airspeed warning device 80 is provided with means 82 integrally incorporated therein to permit the pilot to select one of a plurality of characteristic curves of maximum permissible airspeeds for a particular range of altitudes in the event an aircraft may have a plurality of different flight characteristics. For this reason, the embodiment of FIG. 8 is provided with means 82 whereby a pilot may select the particular curve characteristic desired for energizing the alarm when the maximum airspeed is exceeded for the given particular flight characteristic.

FIG. 9 illustrates two typical speed curves which the instrumentation 80 of the embodiment in FIG. 8 may satisfy. The curve shown by lines A, B, C illustrates a curve similar to that described with respect to FIG. 4. That is, curve A, B, C illustrates a speed curve for an aircraft having a speed characteristic wherein the maximum allowable airspeed increases with altitude in the lower altitude range A, B of the curve A, B, C as shown. The curve A, D, C shown in the solid line is an alternate speed curve which may also be satisfied by the device of FIG. 8. This curve A, D, C indicates that for an intermediate range of altitude D, the maximum permissible airspeed must be maintained constant.

To attain this versatility the device 80 of FIG. 8 comprises a mechanism which is similar to that hereinbefore described, but modified to include a means 82 for accomplishing the intended purpose thereof. Essentially the device 80 of FIG. 8 includes casing 84 for housing the working mechanism of the device. Disposed within the casing 84 is an aneroid altitude capsule 86 which is adapted to expand and contract in response to changes in altitude. As shown the aneroid capsule 86 is connected to the upper wall of the housing 84 by an adjustable center post 88.

Also disposed within the body 84 is an airspeed capsule 90 arranged to expand and contract in response to changes in airspeed. The airspeed capsule 90 is likewise connected to the housing 84 by an adjustable post 92. As hereinbefore described the conduit 94 connects the capsule 90 to the Pitot tube (not shown) of the aircraft; and the interior of the casing 84 is open to static pressure through a suitable opening or tip (not shown).

A floating lever 96 is connected between its ends about a pivot 98 to the center post 88 of the altitude capsule 86. Connected to the end of the lever 96 is an electrical contact 100, which is one of a pair of movable contacts. The other cooperating contact 102 is carried on the end of a lever 104 which is fulcrumed about pivot 106. Accordingly the contacts 100 and 102 are normally urged into contacting relationship by a spring 108 interconnected between the adjacent ends of lever 96 and 104.

It will be noted that the center piece 92 of the airspeed capsule 90 is arranged to displace the lever 104 upwardly as airspeed is increased, as will be hereinafter described.

In the illustrated form, a plurality of stops 110, 112, 114 are disposed on either side of the floating lever pivot. For example two such stops 110 and 112 are shown on one side of the lever 96 and a stop 114 is shown on the other side. Each stop 110, 112, 114 includes an adjustable standard 116 to which there is connected a laterally extending stop bar 118 which extends in the path of the lever 96 to engage the same, and thereby limit the movement thereof in the manner hereinbefore described.

The movable contacts 100, 102 are electrically connected in a circuit 120 containing a warning means 122 as previously described. Accordingly the device 80, as has been so far described, is similar in operation to that previously described. That is, included in the circuit 120 is a relay 124 for energizing the alarm or indicator 122 when the movable contacts 100 and 102 are opened by the center piece 92 of the airspeed capsule 90 as the safe allowable airspeed of the aircraft for a given altitude is exceeded when the selector switch 125 is closed, as will be hereinafter described.

In accordance with this form of the invention there is included in the circuit 120, see FIG. 10, a second pair of contacts 126, 128 which are normally closed. As shown the second pair of contacts 126 and 128 are connected in the circuit 120 in series with contacts 100 and 102. The selector switch 125 is connected across the contacts 126 and 128 to short out the same when the selector switch 125 is closed. Accordingly contacts 126 and 128 are rendered operative when the selector switch 125 is open and rendered inoperative when the selector switch 125 is closed. In all other respects the circuit of FIG. 10 is similar to that of FIG. 3.

Referring to FIG. 8, the second pair of contacts 126, 128 are each carried on adjacent ends of a pair of levers 130 and 132. Lever 130 is pivoted about a fixed pivot 134 and lever 132 is pivoted about pivot 136. Accordingly a spring 138 disposed between adjacent ends of the pair of levers 130 and 132 maintain the contacts 126, 128 normally closed.

Physically lever 130 carrying contact 126 is disposed immediately above lever 104. Connected to lever 104 is an actuator 140 arranged to engage lever 130 to open contacts 126 and 128 to sound the indicator when the maximum allowable airspeed is exceeded by expansion of capsule 90 when the contacts 126 and 128 are operatively connected in the circuit 120. Accordingly when contacts 126 and 128 are operatively connected in the circuit the maximum allowable speed will follow curve A, D, C. When the selector switch 125 is closed the maximum allowable airspeed will follow curve A, B, C.

In operation this is effected as follows. Referring to FIG. 10, it will be noted that with the selector switch 125 closed, contacts 126 and 128 are shorted out of the circuit and they are thus rendered inoperative. Accordingly the circuit will operate in the same manner as described with respect to the circuit of FIG. 3.

With the selector switch 125 open the contacts 126, 128 are operatively connected in the circuit. Thus the alarm 122 will sound when either pair of contacts 100, 102 or 126, 128 open. Accordingly the arrangement is such that the contacts 126 and 128 are opened by the upward displacement of the actuator 140 on lever 140 over the intermediate altitude range D to energize the alarm 122 when maximum airspeed is exceeded. From the foregoing it will be readily noted that the pilot, by selectively positioning the selector switch 125, which is suitably located in the cockpit, can select the desired warning indication in accordance to flight characteristics following either curve A, D, C, or A, B, C.

Accordingly curve A, B, C is established by the respective setting of stops 110, 112, 114.

While the instant invention has been disclosed with reference to several embodiments, it is to be appreciated that the invention is not to be taken as limited to all of the details thereof as modifications and variations thereof may be made without departing from the spirit or scope of the invention.

What is claimed is:

1. An airspeed warning indicator for use in aircraft comprising means responsive to altitude, cooperating means responsive to airspeed, a pair of movable contacts, means for rendering one of said contacts movable in response to said altitude means, means for rendering the other contact movable in response to said cooperating airspeed responsive means, means for maintaining said contacts normally closed during permissive airspeeds for a given altitude, and said contacts being opened by said airspeed responsive means when the safe airspeed is exceeded at a measured altitude, an indicator connected in circuit with said pair of contacts, and means disposed in said circuit for activating said indicator means when said contacts are opened.

2. A mach airspeed warning indicator for use in aircraft comprising means responsive to altitude, cooperating means responsive to airspeed, a pair of movable contacts, means for rendering one of said contacts movable in response to said altitude means, means controlling the movement of said one contact for determining a change in limiting airspeed at the lower altitudes, means for biasing the other contact to closed position with said one contact during permissive airspeeds for a given altitude, said contacts being opened by said airspeed responsive means when safe airspeed is exceeded, an indicator means connected in circuit with said contacts, and means disposed in said circuit for activating said indicator means when said contacts are opened.

3. An airspeed warning indicator comprising:
 (a) a housing,
 (b) an aneroid capsule responsive to changes in altitude mounted within said housing,
 (c) an airspeed capsule responsive to changes in airspeeds disposed within said housing,
 (d) a pair of movable contacts,
 (e) means connecting one of said contacts to said aneroid capsule so as to move in response thereto,
 (f) means biasing the other of said contacts into closed position with said one contact,
 (g) means connecting said other contact to said airspeed capsule for opening said contacts when the airspeed exceeds a predetermined maximum permissible airspeed at a given altitude,
 (h) a warning indicator,
 (i) a relay means,
 (j) energizing circuit means for said relay means including said contacts,
 (k) and energizing current means for said warning indicator including a back contact of said relay.

4. An airspeed warning indicator comprising:
 (a) a housing,
 (b) an aneroid capsule responsive to changes in altitude mounted within said housing,
 (c) an airspeed capsule responsive to changes in airspeeds disposed within said housing,
 (d) a pair of movable contacts,
 (e) a lever fulcrumed intermediate the ends thereof connected to said aneroid capsule, one of said contacts being connected to one end of said lever so as to move in response to the movement imparted to said lever by said aneroid capsule,
 (f) a resilient leaf spring pivoted at one end, said spring having its free end normally urged toward said one contact, and said free end of said spring carrying the other of said movable contacts whereby
 (g) said contacts being maintained closed during permissive speeds for a given altitude,
 (h) a stop means cooperatively associated with said lever for controlling the movement of said contacts,
 (i) a warning indicator,
 (j) a relay means,
 (k) said contacts being opened by the action of said airspeed capsule on said spring when the permissive speed of the aircraft is exceeded,
 (l) energizing circuit means for said relay means including said contacts,
 (m) and energizing circuit means for said warning indicator including a back contact of said relay.

5. An airspeed warning indicator comprising:
 (a) a housing,
 (b) an aneroid capsule responsive to changes in altitude mounted within said housing,
 (c) an airspeed capsule responsive to changes in airspeeds disposed within said housing,
 (d) a pair of movable contacts,
 (e) a lever fulcrumed intermediated the ends thereof and connected to said aneroid capsule, one of said contacts being connected to one end of said lever so as to move in response to the movement imparted thereto by said aneroid capsule,
 (f) a resilient leaf spring pivoted at one end, said spring having its free end normally urged toward said one contact, means connected to said airspeed capsule and engageable with said leaf spring to limit movement of said free end of said leaf spring toward said one contact, said free end of said spring carrying the other of said movable contacts, whereby
 (g) said contacts being maintained closed during permissive speeds for a given altitude,
 (h) a plurality of stop means cooperatively associated with said lever for controlling the movement of said contacts for determining a change in limiting airspeeds,
 (i) a warning indicator,
 (j) a relay means,
 (k) energizing circuit means for said relay means including said contacts,
 (l) and energizing circuit means for said warning indicator including a back contact of said relay.

6. An airspeed warning indicator for use in an aircraft comprising:
 (a) means responsive to altitude,
 (b) cooperating means responsive to airspeed,
 (c) a pair of movable contacts,
 (d) means for rendering one of said contacts movable in response to said altitude means,
 (e) means for rendering the other contact movable in response to said cooperating airspeed responsive means, means for maintaining said contacts normally closed during permissive airspeeds for a given altitude, said contacts being opened by said airspeed responsive means when the safe airspeed is exceeded,
 (f) an indicator,
 (g) a second pair of normally closed contacts, means for opening said second pair of contacts by said airspeed responsive means when a maximum allowable airspeed is exceeded.
 (h) and circuit means for activating said indicator operable when either of said pair of contacts is opened.

7. The invention as defined in claim 6 and including means for shorting out said second pair of contacts to render the same inoperative.

8. A warning device comprising:
(a) an airspeed capsule,
(b) an altitude capsule,
(c) a first pair of contacts,
(d) means for connecting one of said first pair of contacts to said airspeed capsule for movement in response thereto,
(e) means for connecting the other of said first pair of contacts to said altitude capsule for movement in response thereto,
(f) means for biasing said first pair of contacts into closed relation, said contacts being opened by said capsules when said measured airspeed exceeds a predetermined value for said measured altitude,
(g) a second pair of contacts,
(h) means for connecting one of said second pair of contacts to said airspeed capsule for movement in response thereto, said other of said second pair of contacts being independent of either capsule,
(i) means for biasing said second pair of contacts toward a closed condition, whereby said contacts are openable when the measured airspeed exceeds a predetermined value irrespective of altitude,
(j) a warning indicator,
(k) circuit means for energizing warning indicator and including said first and second pairs of contacts, said circuit means being effective upon the opening of either pair of contacts.

9. The warning device of claim 8, further comprising switch means for taking out of circuit said second pair of contacts, whereby to render said energizing circuit means responsive only to said first pair of contacts.

References Cited by the Examiner
UNITED STATES PATENTS

| | | | |
|---|---|---|---|
| 2,785,570 | 3/1957 | Mounteer et al. | 73—182 |
| 3,132,323 | 5/1964 | Hauptman | 340—27 |

NEIL C. READ, *Primary Examiner.*

A. H. WARING, *Assistant Examiner.*